United States Patent
Gill (10) Patent No.: US 11,118,704 B2
(45) Date of Patent: Sep. 14, 2021

(54) WATER JET COIL-TO-HOSE CONNECTOR GUIDE

(71) Applicant: John Bean Technologies Corporation, Chicago, IL (US)

(72) Inventor: Harrison T. Gill, Redmond, WA (US)

(73) Assignee: JOHN BEAN TECHNOLOGIES CORPORATION, Chicago, IL (US)

(*) Notice: Subject to any disclaimer, the term of this patent is extended or adjusted under 35 U.S.C. 154(b) by 180 days.

(21) Appl. No.: 16/146,822

(22) Filed: Sep. 28, 2018

(65) Prior Publication Data
US 2020/0103054 A1  Apr. 2, 2020

(51) Int. Cl.
*F16L 3/215* (2006.01)
*B26F 3/00* (2006.01)

(52) U.S. Cl.
CPC .............. *F16L 3/215* (2013.01); *B26F 3/004* (2013.01)

(58) Field of Classification Search
CPC ..... F16L 3/215; F16L 3/00; F16L 3/16; F16L 3/20; B26F 3/004; B26F 3/00
USPC ........ 248/49, 248, 121, 124.1, 124.2, 125.7, 248/125.8, 125.9, 278.1, 279.1, 280.11, 248/282.1, 283.1, 285.1; 269/71, 291
See application file for complete search history.

(56) References Cited

U.S. PATENT DOCUMENTS

| | | | |
|---|---|---|---|
| 3,978,748 A | 9/1976 | Leslie et al. | |
| 4,140,038 A * | 2/1979 | Higgins | B26F 3/004 83/177 |
| 4,364,535 A * | 12/1982 | Itoh | B23K 26/08 248/123.2 |
| 5,505,653 A * | 4/1996 | Nedo | B23Q 1/0018 451/100 |
| 5,944,896 A * | 8/1999 | Landesman | B05B 13/0285 118/500 |
| 7,726,613 B2 * | 6/2010 | Burnier | B08B 3/026 248/123.11 |
| 7,793,896 B2 | 9/2010 | Pfarr et al. | |
| 8,132,837 B2 * | 3/2012 | Pedrazzini | G01N 35/04 269/254 CS |
| 8,235,333 B2 * | 8/2012 | Pfarr | B26F 3/004 248/121 |
| 8,540,196 B1 * | 9/2013 | Hodson | F16L 3/012 248/121 |
| 2001/0018855 A1 * | 9/2001 | Sciulli | B26F 3/004 83/72 |

(Continued)

OTHER PUBLICATIONS

International Search Report and Written Opinion dated Nov. 27, 2019, in corresponding International Application No. PCT/US2019/051645, filed Sep. 18, 2019, 12 pages.

*Primary Examiner* — Eret C McNichols
*Assistant Examiner* — Michael McDuffie
(74) *Attorney, Agent, or Firm* — Christensen O'Connor Johnson Kindness PLLC (57) ABSTRACT

A fluid delivery/connector system (26) includes a high pressure tubular coil (30) connected to the upper end of a flexible hose (32) by an interface connector assembly (34) which is movable in the up-and-down directions to accommodate the movement of the lower end of the flexible hose which is connected to the nozzle assembly (22) of a fluid cutter system (20). The interface connector assembly (34) is mounted on a guideway (72) which enables the interface connector assembly to travel in an up-and-down direction to accommodate the movement of the nozzle assembly (22).

16 Claims, 8 Drawing Sheets

(56) References Cited

U.S. PATENT DOCUMENTS

| | | | |
|---|---|---|---|
| 2003/0034468 A1* | 2/2003 | Yie | F16K 31/52408 251/77 |
| 2004/0099111 A1* | 5/2004 | Adkins | B26F 3/004 83/98 |
| 2006/0117924 A1 | 6/2006 | Pfarr et al. | |
| 2012/0007009 A1* | 1/2012 | Yie | F16K 31/383 251/321 |
| 2013/0140424 A1* | 6/2013 | Frick | A61B 90/25 248/550 |
| 2015/0118942 A1* | 4/2015 | Hashish | B26F 3/004 451/80 |
| 2017/0248209 A1* | 8/2017 | Piermarini | F16H 25/20 |

* cited by examiner

WATER JET COIL-TO-HOSE CONNECTOR GUIDE

BACKGROUND

High-pressure waterjet cutting systems require the delivery of high pressure fluid to a cutting head which is mounted on a positioning carriage or other type positioning system to move the cutter head during cutting and/or trimming of the workpiece. The positioning carriage or other positioning system rapidly moves the cutting head along an X axis parallel to the travel direction of a conveyor as well as along a Y axis transverse to the travel direction of the conveyor. As such, the cutter head may be positioned in an infinite number of positions that define the two-dimensional plane over the cutting surface. The positioning system moves the cutter head at very high speeds and under high acceleration and deceleration rates resulting in an extremely high level of stress on the components of the positioning system, as well as on the components of the high pressure fluid delivery system that provides the high pressure fluid to the cutter head. These stresses commonly lead to failure of the components of the fluid delivery system.

Various techniques have been employed in order to diminish the stress and wear on the high pressure fluid delivery system, including providing coils in the feed line tubing thereby to accommodate the two-dimensional movement of the cutter head, but also as an attempt to accommodate the fact that as the cutter head moves from underneath the center of the coiled tubing, the distance from the cutter head to the coiled tubing changes, which change in distance is accommodated by lengthening or shortening of the tubing coil. However, the need for the tubing coil to not only lengthen and shorten but also to move in the X and Y directions imposes bending stresses in the coil leading to eventual failure. Also, such unrestrained movement of the coil can lead to vibrations developing in the coil also causing premature failure.

In some installations, a flexible hose is used in lieu of a coil. However, large bending loads can be imposed on the ends of the flexible hose as the lower end of the hose moves laterally and longitudinally of the conveyor belt with the movement of the waterjet nozzle. Moreover, as the hose bottom end returns towards alignment with the hose upper end, a compression load can be imposed on the hose, for which the hose is not particularly designed. Also, the longitudinal and/or lateral movement of the lower end of the hose as it follows the travel of the cutter head can impose twisting moments on the fittings at the end of the hose, leading to failure thereof.

The present disclosure seeks to address the foregoing problems with existing fluid delivery systems for high pressure waterjet systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system is provided for interconnecting a stationary or movable source of high pressure fluid with a movable delivery location distal from the source location. The delivery location can be in the form of a fluid cutter head assembly, which is movable relative to a processing apparatus during the transfer of the high pressure liquid or other fluid. The system includes the high pressure tubing wrapped or formed into a coil so as to define a central axis through the center of the tube coil. The tube coil includes a first end portion connectible to the source of high pressure fluid. The second end of the coil is connectible to an interface connector assembly. A guide is provided to guide and restrain the interface connector assembly to move in a direction parallel to the longitudinal axis of the tube coil to extend and retract the length of the tube coil in the direction along the longitudinal central axis of the tube coil. The proximal end of a flexible tube is also connected to the interface connector assembly, with the distal end of the flexible tube connected to a cutter head assembly or other work tool.

In a further aspect of the present invention, the flexible tube may be in the form of a high pressure hose. In accordance with a further aspect of the present invention, the interface connector assembly is positioned within the envelope of the interior of the tube coil. The guide is also located within the envelope of the interior of the tube coil. In accordance with a further aspect of the present invention, the guide includes a guideway disposed within the interior of the tube coil to guide and restrain the interface connector assembly to move in a direction along the longitudinal center axis of the tube coil.

In a further aspect of the present invention, the guide includes a carriage on which the interface connector assembly is mounted for movement along a guideway. Further, the guideway may be in the form of a slideway. Even further, the slideway may be in the form of one or more slide rods along which the carriage travels.

In a further aspect of the present disclosure, a biasing system is employed to bias the tube coil toward a retracted position. The biasing system may be in the form of a spring, linear actuator, elastic strap, or other device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

The present application refers to "work product or "workpiece" synonymously. One example of a work product or workpiece described in the present application is a pork belly. However, the present invention can apply other foods as well as to work products/workpieces that are not food items.

In the following description and in the accompanying drawings, corresponding systems, assemblies, apparatus and units may be identified by the same part number, but with an alpha suffix. The descriptions of the parts/components of such systems assemblies, apparatus, and units that are the same or similar are not repeated so as to avoid redundancy in the present application.

Figure 1:
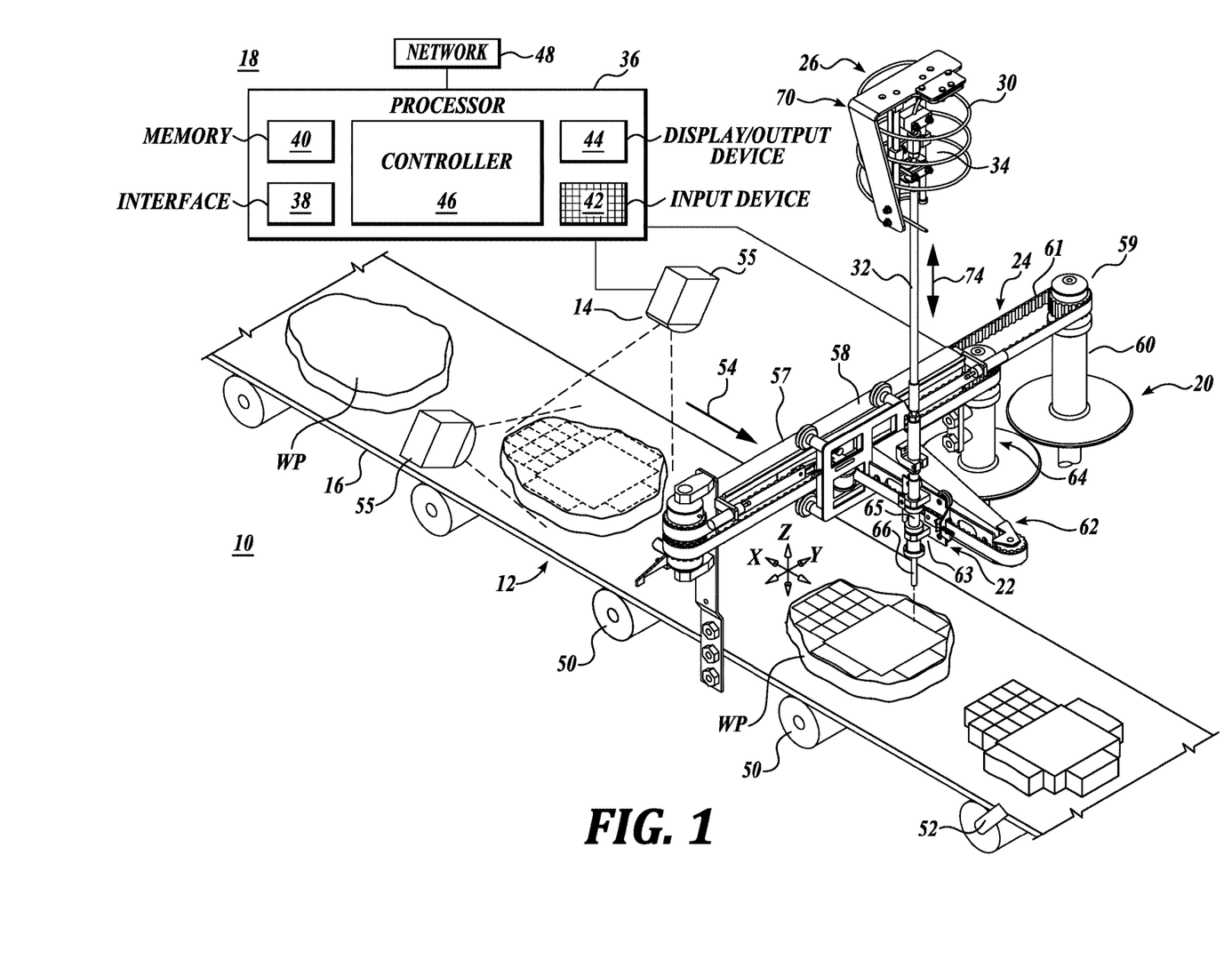
FIG. 1 is a schematic view of a portioning system utilizing the fluid delivery system of the present disclosure.

A first embodiment of the present disclosure is illustrated in FIG. 1 as including a conveyor 12 for carrying individual workpieces WP, such as food products, in a stream, past a scanning station 14, while being transported on conveyor belt 16. The workpieces WP are inspected at scanning station 14 to ascertain physical parameters/characteristics of the workpieces pertaining to, for example, the size and/or shape of the workpieces. Such parameters/characteristics may include, for example, the length, width, length/width aspect ratio, thickness, thickness profile, contour, outer contour configuration, flatness, outer perimeter configuration, outer perimeter size and shape, volume and/or weight, as well as whether the workpieces contain any undesirable materials, such as bones, fat, cartilage, metal, glass, plastic, etc., as well as the location of such undesirable materials in the workpieces. The data from the scanning operation at station 14 is transmitted to a control system 18.

The data from the scanning station 14 is analyzed by the control system 18 to develop a three-dimensional model of the workpiece WP and also to determine how to cut the workpiece into desirable portions and/or trim the workpiece into a desirable overall shape as well as to remove fat, bones, cartilage, or other undesirable materials from the workpiece. This analysis includes determining the cutting paths through the workpiece to be traveled by the nozzle assembly 22 of a waterjet cutting system 20 located downstream from the scanning station 14. The workpiece WP is portioned/trimmed by the cutting system 20 as the workpiece is being carried along in the conveyance direction 54 by conveyor 12. The waterjet cutting system 20 includes a positioning system 24 to move the nozzle assembly 22 in at least the X and Y directions relative to the conveyor belt.

A fluid delivery/connector system 26 provides high pressure water or other fluid from a high pressure source to the nozzle assembly 22. The fluid delivery/connector system 26 includes a high pressure tube that has been formed into a coil 30, with one end connected to the high pressure water source and the opposite end connected to an interface connector assembly 34, which is capable of and constrained to move in the vertical direction, as shown by arrow 74. The upper, proximal end of a flexible hose 32 is connected to the interface connector assembly 34 so as to be in fluid flow communication with the tubular coil 30. The distal, lower end portion of the flexible hose 32 is connected to the nozzle assembly 22 of the waterjet cutting system 20. As the nozzle assembly 22 moves relative to conveyor 12 by the positioning system 24, the interface connector assembly 34 is guided for vertical movement relative to the tubular coil 30 so as to enable the flexible hose 32 to freely move relative to the conveyor 12 during operation of the portioning system 10.

Next, describing the foregoing components and aspects of the processing system 10 in more detail, as schematically shown in FIG. 1, control system 18 includes a processor 36 and an interface 38 therefor for receiving signals and information from the scanning station 14, as well as other data sources of system 10 that may be utilized. A memory unit 40 is provided for storing information regarding the processing system 10. A keyboard or other input device 42 is provided to enable an operator to communicate with the control system 18. Also, a display or other output device 44 is provided to convey information from the processing system to the operator, including the functioning of the system 10 and the results of analyzing the actual cutting path taken by nozzle assembly 22 when portioning and/or trimming the workpiece WP. The control system also includes a controller 46 which may be in the form of a programmable logic controller or other type of controller, for controlling the operation of the system 10, including conveyor 12, scanning station 14 and cutting system 20. The control system 18 can be connected to a network 48. Also, rather than employing a local control system 18, a network computing system can be used for this purpose.

Still referring to FIG. 1, conveyor 12 carries individual workpieces WP in a stream beneath scanning station 14 and then beneath cutting system 20. The conveyor 12 includes a powered belt 16 which is supported by a series of rollers 50 to train around end rollers, not shown, one of which is the drive roller, which drives the belt 16 in a standard manner. An encoder 52 is employed with respect to one of the support rollers 50, or an end roller, for use to determine the position of the workpiece WP on the conveyor belt as well as the progress or movement of the workpiece along the conveyance direction 54.

Although a single belt 16 is shown, the conveyor system 12 may be composed of one or more belts, for instance, a flat, solid belt may support the workpiece during scanning at station 14. Such belts are typically flat, non-metallic belts. The workpiece can be transferred from the first flat belt to the second belt which supports the workpiece during the portioning or trimming process at station 20. If a waterjet cutting system 20 is used to portion or trim the workpiece, it is advantageous to utilize an open mesh, metallic belt to allow the waterjet to pass downwardly there through, and also so that the belt is of sufficient structural integrity to withstand the impact thereon from the waterjet. Such metallic, open mesh belts are articles of commerce.

The scanning system 14 may be a variety of different types, including a video camera (not shown) to view a workpiece WP illuminated by one or more light sources 55. Light from the light source 55 is extended across the moving conveyor belt 16 to define a sharp shadow or light stripe line, with the area forwardly of the transverse beam being dark. When no workpiece WP is being carried by the conveyor 12, the shadow line/light stripe forms a straight line across the conveyor belt 16. However, when a workpiece WP passes across the shadow line/light stripe, the upper, irregular surface of the workpiece produces an irregular shadow line/light stripe as viewed by a video camera (not shown) directed diagonally downwardly on the workpiece and the shadow line/light stripe. The video camera detects the displacement of the shadow line/light stripe from the position it would occupy if no workpiece were present on the conveyor belt. This displacement represents the thickness of the workpiece along the shadow line/light stripe.

The length of the workpiece is determined by the distance of the belt travel that shadow line/light stripes are created by the workpiece. In this regard, the encoder 52, integrated into the conveyor 12, generates pulses at fixed distance intervals corresponding to the forward movement of the conveyor.

In lieu of a video camera, the scanning station may instead utilize an x-ray apparatus (not shown) for determining the physical characteristics of the workpiece, including its shape, mass, and weight. X-rays may be passed through the object in the direction of an x-ray detector (not shown). Such x-rays are attenuated by the workpiece in proportion to the mass thereof. The x-ray detector is capable of measuring the intensity of the x-rays received thereby, after passing through the workpiece. This information is utilized to determine physical parameters pertaining to the size and/or shape of the workpiece, including for example, the length, width, aspect ratio, thickness, thickness profile, contour, outer contour configuration, perimeter, outer perimeter configuration, outer perimeter size and/or shape, volume and/or weight, as well as other aspects of the physical parameters/characteristics of the workpiece. With respect to the outer perimeter configuration of the workpiece WP, the X-ray detector system can determine locations along the outer perimeter of the workpiece based on an X-Y coordinate system or other coordinate system. An example of such an x ray scanning device is disclosed in U.S. Pat. No. 5,585,603, incorporated by reference herein.

The foregoing scanning systems are known in the art and, thus, are not novel per se. However, the use of these scanning systems in conjunction with the other aspects of the described embodiments of the present disclosure is believed to be new.

As shown in FIG. 1, the waterjet cutter system 20 includes a nozzle assembly 22 that may be moved relative to the conveyor 12 both longitudinally of the conveyor and laterally of the conveyor, as well as optionally vertically relative to the conveyor surface. This enables the waterjet cutter system 20 to portion/trim the workpiece so as to achieve a desired shape and portioned into desired portion sizes, portion weights, portion shapes, portion thicknesses, maximum fat content, or other parameters.

As shown in FIG. 1, the jet cutting apparatus 20 in basic form includes positioning system 24 in the form of a support structure 57 extending across the conveyor 12 for supporting and guiding a first carriage 58 for movement transversely to the direction of movement 54 of the conveyor 12. The carriage 58 is powered by a drive system 59 including, in part, a motive system 60 and a drive train 61. A second, longitudinal support structure 62 is cantilevered outwardly from carriage 58 in a direction generally aligned with the direction of movement 54 of the conveyor 12. A second longitudinal carriage 63 is adapted to move along longitudinal support structure 62 by the drive system 59. In this regard, a second motive system 64 powers the longitudinal carriage 63 through the drive train 61.

The high-speed waterjet nozzle assembly 22 is mounted on the longitudinal carriage 63 to move therewith as the nozzle operates on (cuts or trims) the underlying workpiece WP being carried by the conveyor 12. The nozzle assembly 22 includes a body portion 65 that is secured to the carriage 63. The nozzle assembly 22 also includes a lower outlet tip 66 directed downwardly towards conveyor belt 16. High-pressure liquid nozzle assemblies of the type of nozzle assembly 22 are articles of commerce. High-pressure water is supplied to nozzle assembly 22 by fluid delivery/connector structure 26, as described below.

As workpieces WP are carried along conveyor 12, the nozzle assembly 22 is moved along selected paths of travel by the positioning system 24 composed of carriages 58 and 63 powered by drive system 59. Carriage 58 moves the nozzle assembly 22 transversely, and carriage 63 moves the nozzle assembly longitudinally relative to the direction of travel of the conveyor 12. This enables the nozzle assembly 22 to travel very quickly along routes which are programmed into the operation of the servo motors of the motive systems 60 and 64 by control system 18. As a consequence, high levels of force can be placed on the tubes and/or hoses used to deliver high pressure fluids, including water, to the nozzle assembly 22, which the present application seeks to address.

FIGS. 2, 3, 4A and 5 also illustrate the fluid delivery/connector system 26. The system in basic form includes a high pressure tubular coil 30 connected to the upper end of a flexible hose 32 by an interface connector assembly 34 that is movable up and down to accommodate the movement of the lower end of the flexible hose which is connected to the nozzle assembly 22 of the fluid cutter system 20. The interface connector assembly 34 is carried by a guide in the form of a guideway 72 to travel up-and-down between its nominal upward position shown in FIG. 4A to a lowered shown in FIG. 4B, as depicted by arrow 74. The guideway 72 is mounted on a mounting bracket assembly 70 that can be mounted in a stationary location or mounted for movement.

Figure 2:
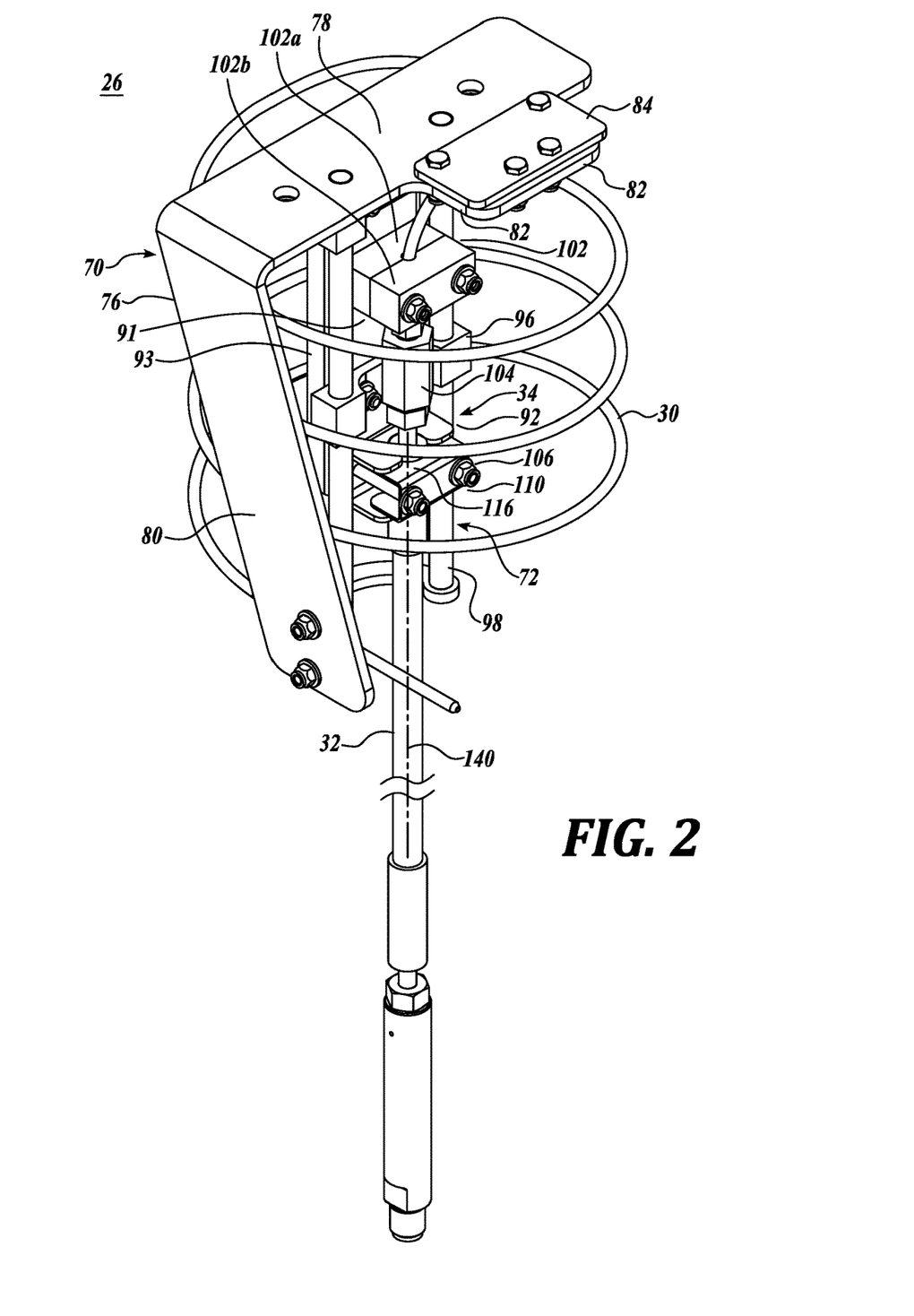
FIG. 2 is an isometric view of the fluid delivery system of the present disclosure.
Figure 3:
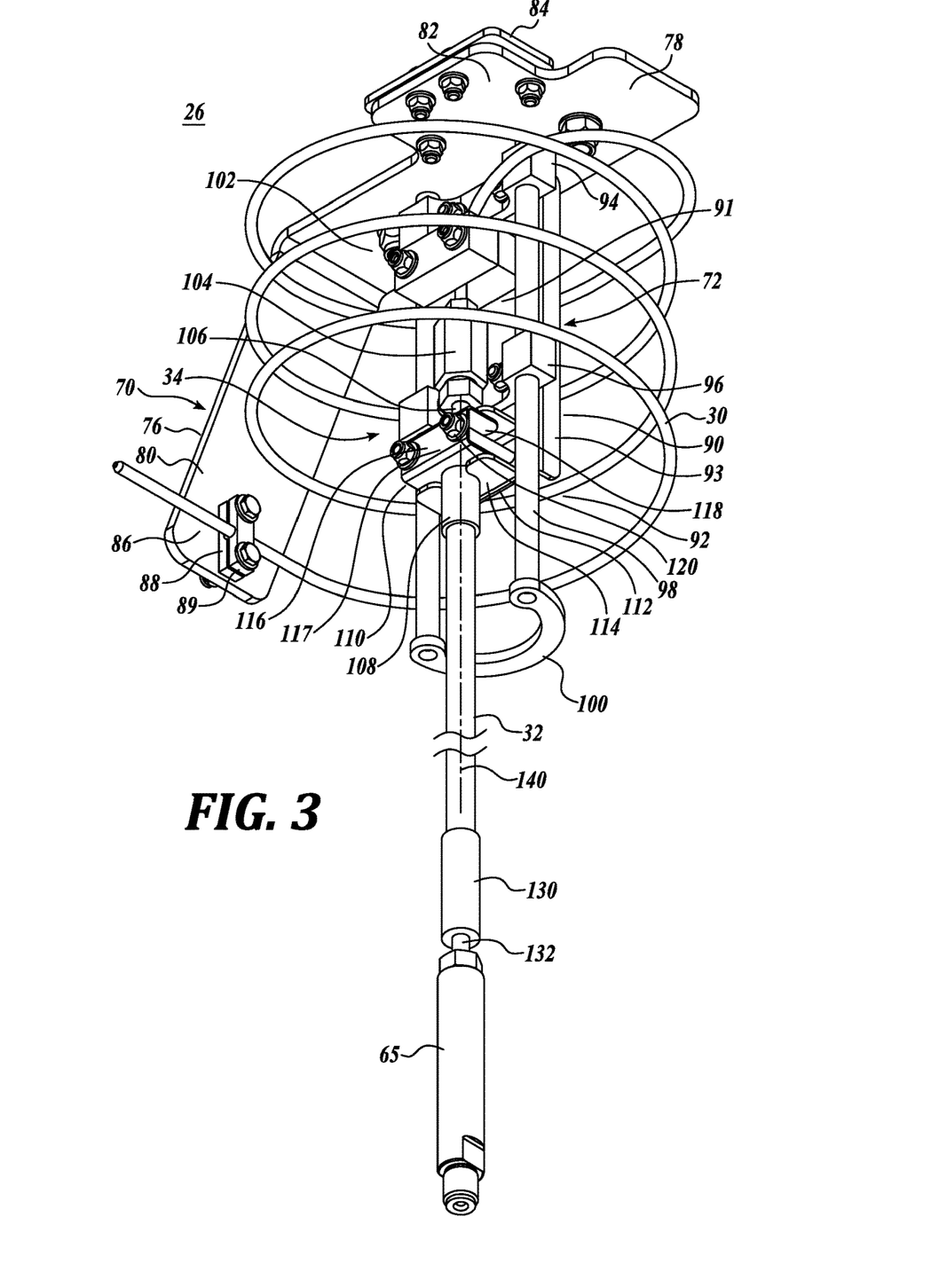
FIG. 3 is a view similar to FIG. 2 but from a different angle of the fluid delivery system.

Describing the fluid delivery/connector system 26 with more particularity, the mounting bracket assembly 70 includes an angle shaped bracket 76 having a horizontal upper leg 78 and a vertical lower leg 80. The bracket is generally of constant width except for a widened section 82 on the upper leg 78 extending sideways from the upper leg. A connector plate 84 is mountable face to face with the widened section 82 for mounting the bracket assembly at a desired location. In this regard, the connector plate can be placed over a housing ceiling so that the bolts depending from the plate 84 extend down through holes formed in the ceiling and then through mating holes in the widened section 82 thereby to sandwich the housing ceiling there between. Of course, the mounting bracket 70 can be mounted in place by other means.

A clamp assembly 86 is mounted to the lower portion of the lower leg 80 to which the adjacent end portion of the tubular coil 30 is attached. The clamp assembly includes face to face mounting block halves 88 and 89 that cooperate to capture the tubular coil 30 there between thereby to securely hold this portion of the coil stationary relative to the bracket 76.

The interface connector assembly 34 includes an upright rectangularly shaped carriage 90 slidably mounted on a slideway 92. The carriage 90 has a rectangularly shaped base plate 91 and transverse flanges 93 extending laterally from the vertical side edges of the base plate portion to provide rigidity for the carriage. A pair of slide brackets 94 and 96 is mounted transversely to the upper and lower portions of the carriage 90. The slide brackets are bolted or otherwise fastened to the carriage base 91 and include lug portions at their outer end portions that define aligned through holes to closely and slidably engage with guide rods 98 of the slideway 92. The guide rods 98 are mounted to the underside of the flange upper leg 78 to extend downwardly therefrom in spaced parallel relationship. An arcuate connector plate 100 is affixed to the lower ends of the guide rods 98 to tie the guide rods together. The curvature of the connector plate 100 provides clearance for the flexible hose 32.

The lower end of the flexible hose 30 is attached to the upper end of the waterjet nozzle assembly 22 by a fitting 130. A tubular member 132 projects from the lower end of the fitting 130 for connection with the upper end of the waterjet nozzle assembly 22.

The upper end portion of the tubular coil 30 is clamped to an upper portion of the carriage 90 by a clamping block assembly 102 which is similar to clamp assembly 86. To this end, the block assembly includes "lower" and "upper" clamp blocks 102a and 102b, both formed with central transverse grooves extending there between to cooperatively define a substantially circular opening to tightly receive a section of the tubular coil 30 therein, with the coil section disposed in a downward direction. The tubular coil 30 extends downwardly from the clamping block assembly 102 to engage an interface connector 104 that extends vertically along a central portion of the carriage 90. A tubular section 106 engages with the lower end of the interface connector 104 to extend downwardly into a fitting 108 attached to the upper end of the flexible hose 32.

The fitting 108 is held in place by a two-piece clamp assembly 110. The clamp assembly 110 includes two channel members 112 and 116 that mate together to securely hold the fitting 108 there between. The first channel member 112 of the clamp assembly 110 extends transversely to the carriage base 91 with its central web portion attached to the carriage base. Parallel flanges 114 project from the central web, with the central portions of flanges cut out in a U-shape to closely receive the circular fitting 108 there between. A mating second channel member 116 includes a web portion 117 and parallel flanges 118 also having a U-shaped cutout in their central portions for closely receiving the circular fitting 108 there between. Hardware members in the form of bolts 120 are used to draw the two channel members 112 and 116 towards each other thereby to securely clamp the fitting 108 there between.

In operation, as the positioning system 24 moves the nozzle assembly 22 in the X and Y directions and thus away from vertical alignment with the interface connector assembly 34, the carriage 90 slides downwardly with respect to the slideway 92 to reflect the greater distance between the lower end of the flexible hose 32 and its connection location with the interface connector 34. Such movement causes the coils of the tubular coil 30 to compress downwardly as shown in FIG. 4B. When the nozzle assembly 22 returns to a location more closely beneath the interface connector 34, the coils of the tube coil 30 return to their nominal separation as shown in FIG. 4A thereby lifting the carriage 90 back upwardly to the position shown in FIG. 4A.

Figure 4A:
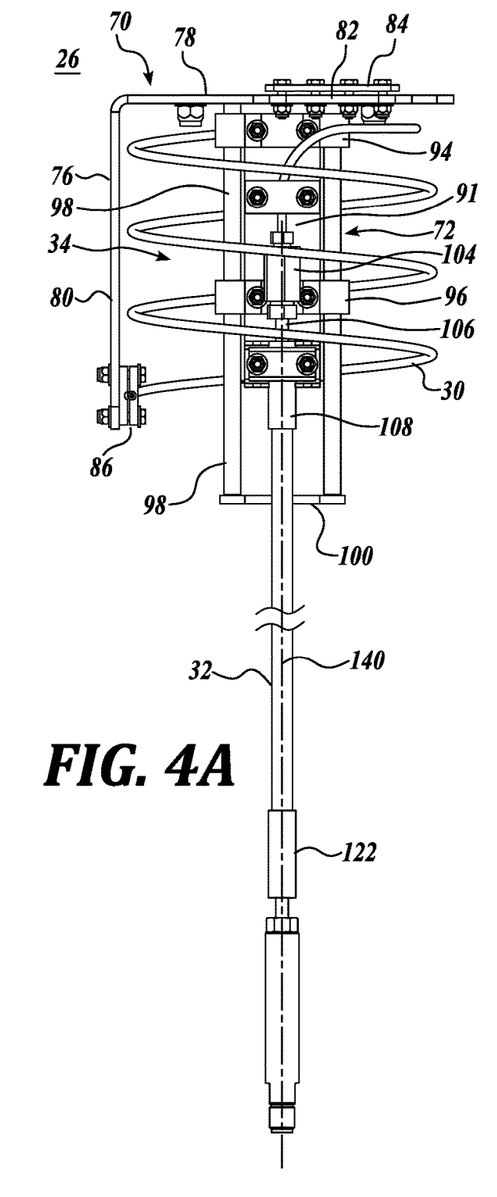
FIG. 4A is an elevation view of the fluid delivery system, with the interface connector in retracted upward position.
Figure 4B:
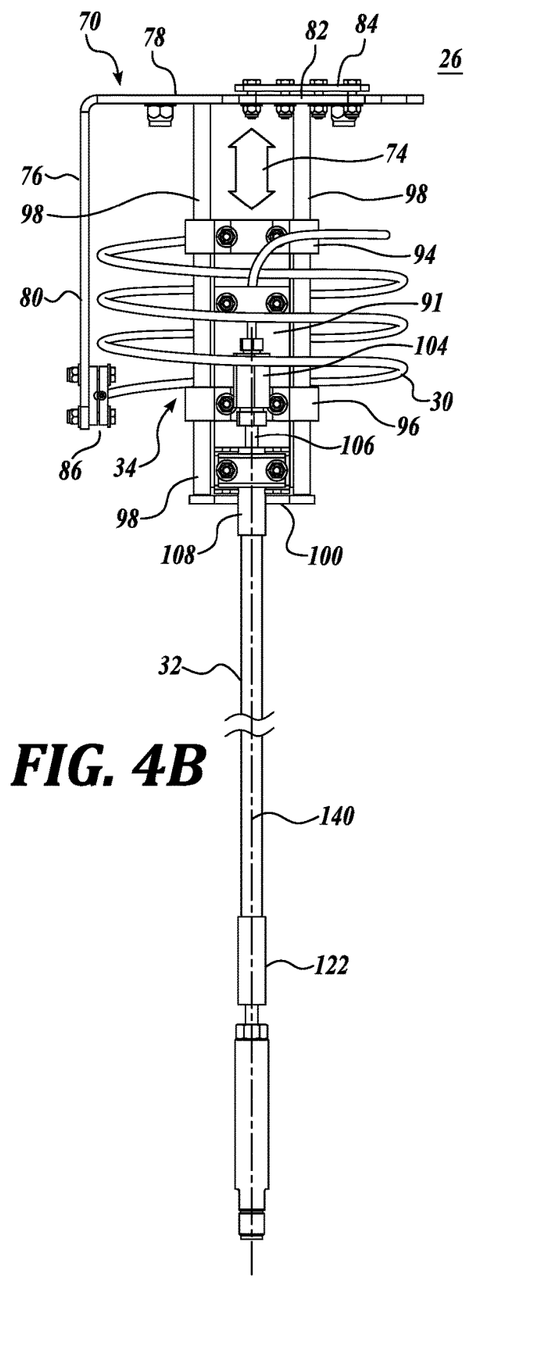
FIG. 4B is a view similar to FIG. 4A, but with the interface connector shown extended downwardly.

If need be, a biasing system can be used to assist the coils of the tube coil to return to their nominal position of FIG. 4A after being compressed to the position shown in FIG. 4B. As shown schematically in FIG. 6, such biasing system could be in the form of an extension spring 122 extending downwardly from the underside 82 of bracket upper leg 78 to a transverse bracket 124 extending rearwardly from a bottom portion of the carriage 90. As the carriage slides downwardly under the pulling action of hose 32, the spring 122 is extended so as to create an upwardly directed force on the carriage 90. When the hose 32 returns to a location more closely beneath the fitting 108, the carriage 90 is biased in the upward direction by both the tube coil 30 as well as the extension spring 122.

Figure 6:
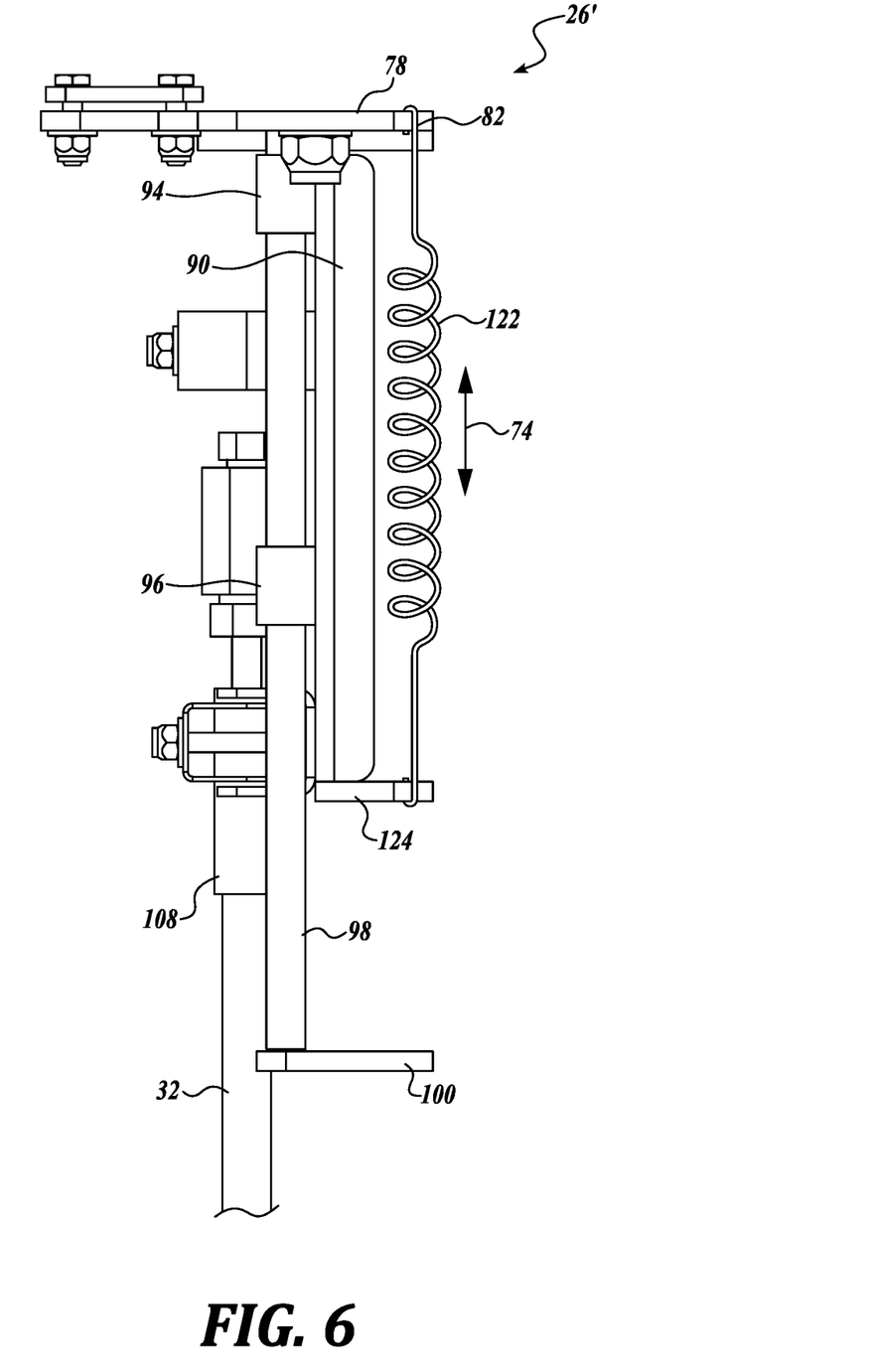
FIG. 6 is a schematic side elevational view of part of the fluid delivery system illustrating the use of a spring for biasing the fluid delivery system into nominal position.
Figure 7:
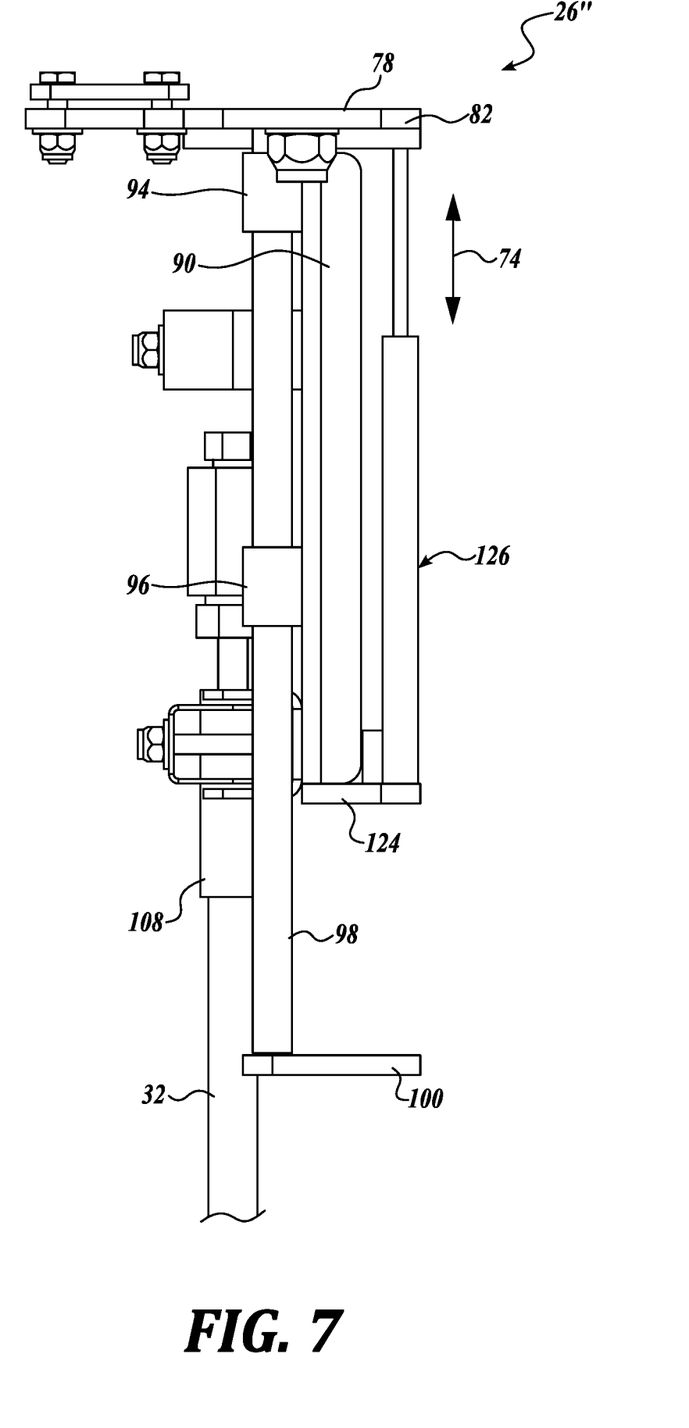
FIG. 7 is a view similar to FIG. 6 showing a linear actuator in place of a spring.
Figure 8:
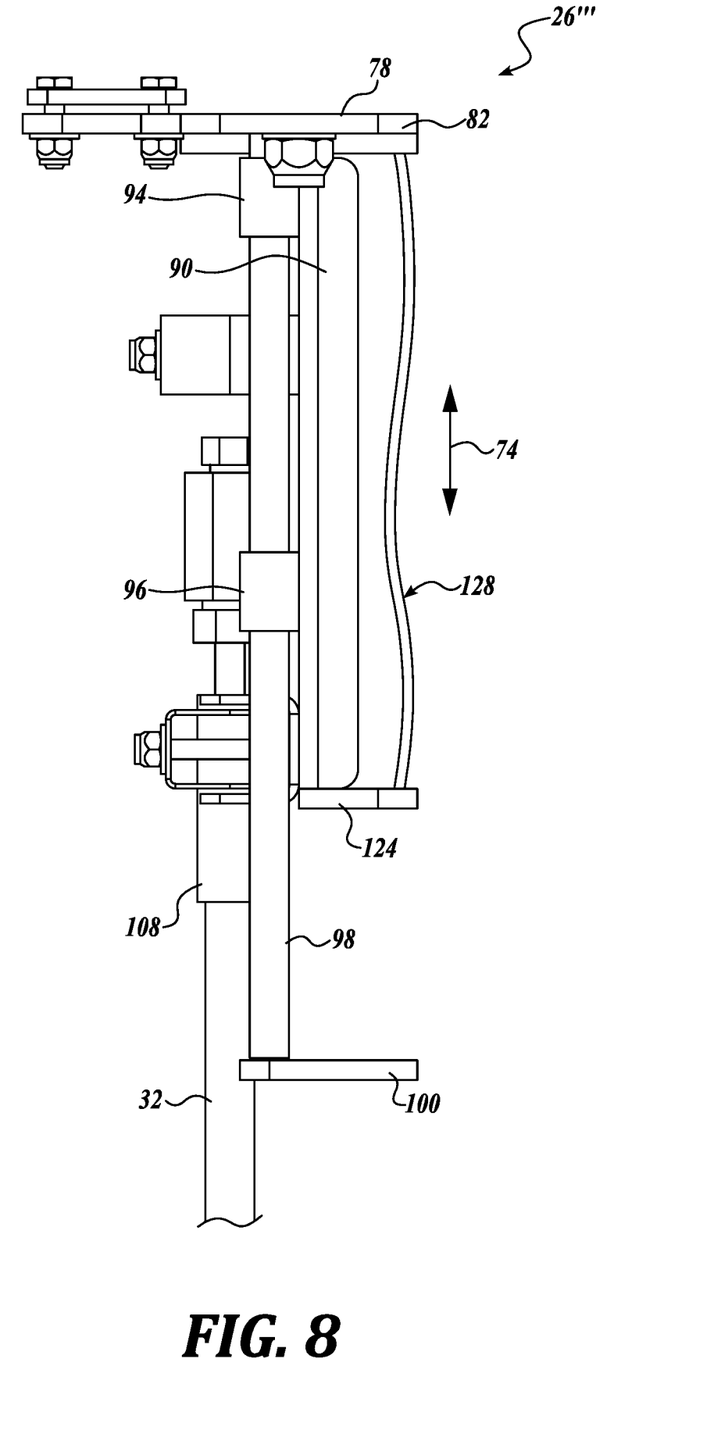
FIG. 8 is a view similar to FIG. 6 showing the use of an elastic strap in the place of a spring.

The spring 122 can be replaced by other biasing means, such as by a linear actuator 126 shown in FIG. 7, or by an elastic strap 128 shown in FIG. 8. Of course, other types of biasing systems may be utilized and such systems may be installed other than as shown in FIG. 6, 7 or 8.

It will be appreciated that during the operation of the portioning system 10 with the movement of the nozzle assembly 22 causing the vertical movement of the carriage 90, the tube coil 30 is restrained to move only in a vertical direction. As a consequence, less stress is placed on the tube coil than if the tube coil also were required to move in a direction laterally of the central axis of the tube coil. It will also be appreciated that the ends of the flexible hose are maintained in vertical direction even though the lower end of the flexible hose moves in the X and Y directions. This reduces the stresses placed on the fittings at the upper and lower ends of the flexible hose in comparison with a situation in which the hose fittings were required to be turned in a direction laterally or transverse to the length of the hose.

It will also be appreciated that the interface connector assembly 34 of the fluid delivery/connector system 26 is positioned within the interior of the tubular coil 30 and in substantial alignment with the longitudinal center line of the coil 140. As a consequence, the fluid delivery system is in compact form, minimizing the overall envelope size of the fluid delivery system.

In addition, the upper end of the coil 30 is attached to carriage 90 via clamping block assembly 102 so that the coil end is in substantial alignment with the center line 140 of the coil. As such, when the coil is compressed as shown in FIG. 4B, the coil tends to stay within its same overall cylindrical or circular envelope by moving in a substantially vertical or up-and-down direction, rather than tending to move in a lateral direction during compression and extension. This helps to not impose additional bending stresses on the coil as the coil is compressed and extended.

Although the tubular coil 30 is illustrated as composed of four rounds of circumferences of the coiled tube, the coil can be instructed with fewer or more wraps depending on various factors, including the vertical travel distance of the carriage 90, the size and stiffness of the tube comprising the coil 30, the desired resistance to be imposed on the downward movement of the carriage 90, and other factors. Also, the overall diameter of the coil 30 can be varied to change the operating characteristics of the fluid delivery system 26. As a non-limiting example, the diameter of the tubular coil can be from about 7 to 11 inches. The external diameter of the tubing forming the coil can be from about 0.2 to 0.3 inches and the internal diameter of the tubing forming the coil can be from about 0.07 to 0.09 inches. The wall thickness of the tubing can be from about 0.07 to 0.09 inches.

Figure 5:
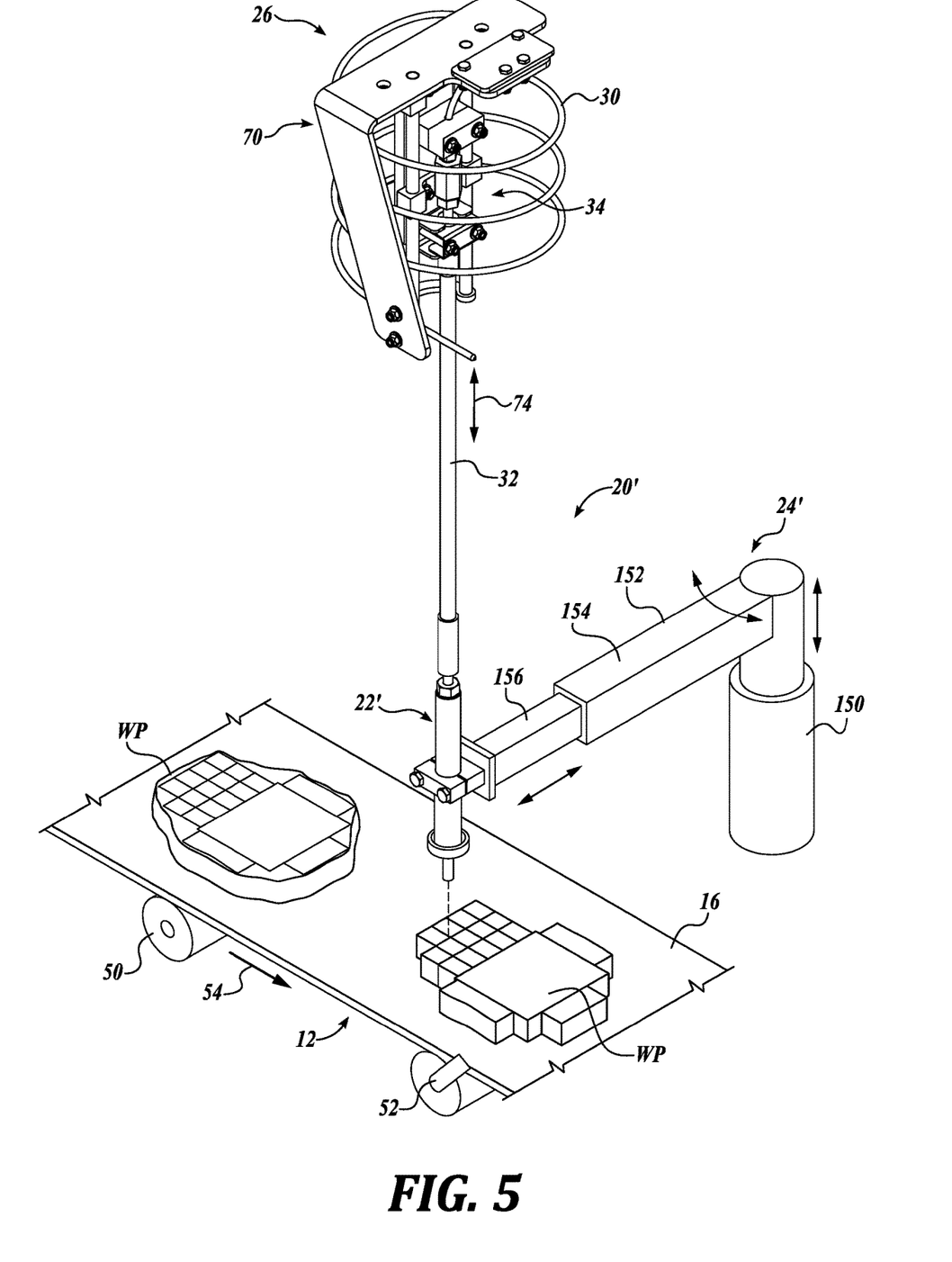
FIG. 5 is a view similar to FIG. 1 illustrating a further embodiment of the present disclosure.

A further aspect of the present disclosure is illustrated in FIG. 5 wherein positioning system 24' is illustrated as composed of rotatable, elevatable and extendible structure. The elements of system 24' that are the same as system 24 are identified by the same part numbers. As shown in FIG. 5, the positioning system 24' includes a rotatable and elevatable post assembly 150 mounted alongside conveyor 12. The post assembly 150 is powered to raise and lower relative to the surface of the conveyor belt 16, and also to rotate a telescoping beam 152 over the conveyor belt 16. The telescoping beam 152 includes a proximal distal outer section 154 projecting from the top of the post assembly 150 and an extendible telescoping section 156 that is powered to extend and retract along its length so as to position the nozzle 22 at desired locations over the surface of the conveyor belt 16. The nozzle assembly 22 is mounted at the projecting end of the telescoping section 156.

It will be appreciated that the positioning system 24' is capable of moving the nozzle assembly 22 in a manner similar to the movement of the nozzle assembly by the positioning system 24 described above.

While illustrative embodiments have been illustrated and described, it will be appreciated that various changes can be made therein without departing from the spirit and scope of the invention. For example, the fluid delivery system 26 can be mounted in place other than by other than the bracket 70. Also, tubular coil 30 can be mounted on a moving machine element rather than at a stationary location. In addition, the fluid deliver system can be used for delivering other fluids in addition water for cutting foods and other work products, for example to deliver paint to a paint gun or air and grit to a sand blaster or liquid nitrogen to processing machine. Further other positioning systems may be utilized in addition to positioning systems 24 and 24', for example cartesian, SCARA cylindrical, delta, polar and vertically articulated robots.

The embodiments of the invention in which an exclusive property or privilege is claimed are defined as follows:

1. A connector system for interconnecting a stationary or movable source of high pressure fluid with a movable delivery location distal from the source of the high pressure fluid, comprising:
   (a) high pressure tubing wrapped into a tube coil to define a fixed central longitudinal axis extending through the tube coil, the tube coil having a first end connectable to the source of high pressure fluid, and having a second end;
   (b) an interface connector assembly connected to the second end of the tube coil;
   (c) a guide to guide and constrain the interface connector assembly to move longitudinally in a direction parallel with the fixed longitudinal axis of the tube coil to extend and retract the length of the tube coil in a direction along the fixed longitudinal axis of the tube coil;
   (d) a flexible tube having a proximal end connected to the interface connector assembly and a distal end for discharging the high pressure fluid;
   (e) wherein the guide comprises at least one longitudinal guide member along which the interface connector assembly travels to guide and restrain the interface connector assembly to move in a direction along the fixed longitudinal axis of the tube coil; and
   (f) wherein the interface connector assembly is positioned within an envelope defined by the interior of the tube coil.

2. The connector system according to claim 1, wherein the flexible tube comprises a hose.

3. The connector system according to claim 1, wherein the guide is located within the envelope defined by the interior of the tube coil.

4. The connector system according to claim 1, wherein the at least one longitudinal guide member is disposed within the envelope defined by the interior of the tube.

5. The connector system according to claim 1, wherein the at least one longitudinal guide member comprises at least one longitudinal guide rod along which the interface connector assembly travels.

6. The connector system according to claim 5, comprising two guide rods in spaced parallel relationship to each other for guiding movement of the interface connector assembly.

7. The connector system according to claim 1, further comprising a biasing system to bias the tube coil toward a retracted position.

8. The connector system according to claim 7, wherein the biasing system includes:
   (a) a spring;
   (b) a linear actuator;
   (c) an elastic strap.

9. A connector system for interconnecting a stationary or movable source of high pressure fluid with a movable delivery location distal from the source of the high pressure fluid, comprising:
   (a) high pressure tubing wrapped into a tube coil to define a central longitudinal axis extending through the tube coil, the tube coil having a first end connectable to the source of high pressure fluid, and having a second end;
   (b) an interface connector assembly connected to the second end of the tube coil;
   (c) a guide to guide and constrain the interface connector assembly to move in a direction parallel with the longitudinal axis of the tube coil to extend and retract the length of the tube coil in a direction along the longitudinal axis of the tube coil; and
   (d) a flexible tube having a proximal end connected to the interface connector assembly and a distal end for discharging the high pressure fluid; and
   (e) wherein the guide comprises a carriage on which the interface connector assembly is mounted, the carriage movable along the guide.

10. A delivery system for transferring high pressure liquid from a first location on a processing system to a second location at a cutter head assembly distal from the first location, the cutter head assembly movable relative to the processing system during the transferring of the high pressure liquid, the delivery system comprising:
   (a) high pressure tubing formed into a tube coil to define a fixed, central longitudinal axis, one end of the tube coil connected to the first location on the processing system, and a second end at the distal end of the tube coil;

(b) an interface connector assembly connectable to the second end of the tube coil;

(c) a guide to guide and restrain the interface connector assembly to move longitudinally in a direction parallel with the fixed central longitudinal axis of the tube coil to extend and retract the length of the tube coil in a direction along the fixed longitudinal axis of the tube coil;

(d) a flexible hose having a proximal end connected to the interface connector assembly and a distal end connected to the cutter head assembly;

(e) wherein the guide comprises at least one longitudinal guide member engaged with the interface connector assembly to guide and restrain the interface connector assembly to move in a direction along the fixed longitudinal axis of the tube coil; and (f) wherein the interface connector assembly is positioned within an envelope formed within the interior of the tube coil.

11. The delivery system according to claim 10, wherein the guide is located within the envelope of the interior of the tube coil.

12. The delivery system according to claim 10, wherein the at least one longitudinal guide member is disposed within the envelope of the interior of the tube coil.

13. The delivery system according to claim 12, wherein the guideway comprises at least one longitudinal guide rod along which the interface connector assembly travels.

14. The delivery system according to claim 10, further comprising a biasing system to bias the coiled tube toward a retracted position.

15. The delivery system according to claim 14, wherein the biasing system includes at least one of:
(a) a spring;
(b) a linear actuator;
(c) an elastic strap.

16. A delivery system for transferring high pressure liquid from a first location on a processing system to a second location at a cutter head assembly distal from the first location, the cutter head assembly movable relative to the processing system during the transferring of the high pressure liquid, the delivery system comprising:

(a) high pressure tubing formed into a tube coil to define a central longitudinal axis, one end of the tube coil connected to the first location on the processing system, and a second end at the distal end of the tube coil;

(b) an interface connector assembly connectable to the second end of the tube coil;

(c) a guide to guide and restrain the interface connector assembly to move in a direction parallel with a central longitudinal axis of the tube coil to extend and retract the length of the tube coil in a direction along the longitudinal axis of the tube coil; and (d) a flexible hose having a proximal end connected to the interface connector assembly and a distal end connected to the cutter head assembly; and (e) wherein the guide comprises a carriage on which the interface connector assembly is mounted, and the carriage is configured to move along the guide.

* * * * *